United States Patent
Bill

(10) Patent No.: US 8,458,102 B2
(45) Date of Patent: *Jun. 4, 2013

(54) USER BEHAVIOR-BASED REMOTELY-TRIGGERED AUTOMATED ACTIONS

(75) Inventor: David S. Bill, San Francisco, CA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,312

(22) Filed: Apr. 30, 2012

(65) Prior Publication Data

US 2012/0221493 A1    Aug. 30, 2012

Related U.S. Application Data

(63) Continuation of application No. 11/944,006, filed on Nov. 21, 2007, now Pat. No. 8,170,960.

(60) Provisional application No. 60/867,077, filed on Nov. 22, 2006.

(51) Int. Cl.
  *G01C 21/30* (2006.01)
  *G01C 21/32* (2006.01)
  *G06F 17/00* (2006.01)
  *G06F 17/20* (2006.01)
  *G06N 5/02* (2006.01)

(52) U.S. Cl.
  USPC ............................. 706/11; 706/48

(58) Field of Classification Search
  USPC . 706/11, 14, 48; 340/988–990; 701/207–210, 701/213
  See application file for complete search history.

(56) References Cited

U.S. PATENT DOCUMENTS

| | | | |
|---|---|---|---|
| 5,948,040 | A | 9/1999 | DeLorme et al. |
| 6,049,753 | A | 4/2000 | Nimura |
| 6,282,489 | B1 | 8/2001 | Bellesfield et al. |
| 6,498,982 | B2 | 12/2002 | Bellesfield et al. |
| 6,529,819 | B2 | 3/2003 | Baur et al. |
| 6,549,768 | B1 | 4/2003 | Fraccaroli |
| 6,577,937 | B1 | 6/2003 | Shuman et al. |
| 6,622,087 | B2 | 9/2003 | Anderson |
| 6,687,608 | B2 | 2/2004 | Sugimoto et al. |

(Continued)

FOREIGN PATENT DOCUMENTS

| | | |
|---|---|---|
| WO | WO 99/09374 | 2/1999 |
| WO | WO 00/74019 | 12/2000 |

OTHER PUBLICATIONS

Office Action, U.S. App. No. 11/413,109, mailed Jun. 26, 2009 (7 pages).

(Continued)

*Primary Examiner* — Alan Chen
*Assistant Examiner* — Benjamin Buss
(74) *Attorney, Agent, or Firm* — Finnegan, Henderson, Farabow, Garrett & Dunner, LLP

(57) ABSTRACT

An action is triggered by receiving information related to a predicted destination of a user, accessing a library that maps user actions to destinations, determining that at least one of the destinations in the library corresponds with the predicted destination of the user and at least one of the destinations in the library, identifying a user action, within the library, that is associated with the destination determined to correspond with the predicted destination of the user, and triggering the user action.

20 Claims, 5 Drawing Sheets

U.S. PATENT DOCUMENTS

| | | | |
|---|---|---|---|
| 6,812,888 B2 | 11/2004 | Drury et al. | |
| 6,941,222 B2 | 9/2005 | Yano et al. | |
| 6,978,246 B1 | 12/2005 | Ruvolo et al. | |
| 6,993,430 B1 | 1/2006 | Bellesfield et al. | |
| 7,050,903 B1 | 5/2006 | Shutter et al. | |
| 7,096,115 B1 | 8/2006 | Groth et al. | |
| 7,130,743 B2 | 10/2006 | Kudo et al. | |
| 7,139,659 B2 | 11/2006 | Mbekeani et al. | |
| 7,176,813 B2 | 2/2007 | Kawamata et al. | |
| 7,187,278 B2 * | 3/2007 | Biffar | 340/539.13 |
| 7,194,419 B2 | 3/2007 | Robertson et al. | |
| 7,216,022 B2 | 5/2007 | Kynast et al. | |
| 7,289,039 B2 | 10/2007 | Kato et al. | |
| 7,439,878 B2 | 10/2008 | Kato et al. | |
| 2002/0072356 A1 | 6/2002 | Yamashita et al. | |
| 2003/0069683 A1 | 4/2003 | Lapidot et al. | |
| 2004/0102896 A1 | 5/2004 | Thayer et al. | |
| 2004/0104842 A1 | 6/2004 | Drury et al. | |
| 2004/0128066 A1 | 7/2004 | Kudo et al. | |
| 2004/0158389 A1 * | 8/2004 | Shibata et al. | 701/200 |
| 2005/0065711 A1 | 3/2005 | Dahlgren et al. | |
| 2005/0076078 A1 | 4/2005 | Salton | |
| 2005/0096842 A1 | 5/2005 | Tashiro | |
| 2005/0114014 A1 | 5/2005 | Isaac | |
| 2005/0143903 A1 | 6/2005 | Park et al. | |
| 2005/0165762 A1 | 7/2005 | Bishop | |
| 2006/0058950 A1 | 3/2006 | Kato et al. | |
| 2006/0064237 A1 | 3/2006 | Mbekeani et al. | |
| 2006/0158330 A1 | 7/2006 | Gueziec | |
| 2006/0167592 A1 | 7/2006 | Kudo et al. | |
| 2006/0173841 A1 | 8/2006 | Bill | |
| 2006/0178807 A1 | 8/2006 | Kato et al. | |
| 2007/0010942 A1 | 1/2007 | Bill | |
| 2007/0032225 A1 | 2/2007 | Konicek et al. | |
| 2007/0073477 A1 | 3/2007 | Krumm et al. | |
| 2007/0078599 A1 | 4/2007 | Yoshioka et al. | |
| 2007/0112922 A1 | 5/2007 | Kurata et al. | |
| 2007/0150174 A1 | 6/2007 | Seymour et al. | |
| 2007/0208497 A1 * | 9/2007 | Downs et al. | 701/117 |
| 2007/0208498 A1 * | 9/2007 | Barker et al. | 701/117 |
| 2008/0005695 A1 | 1/2008 | Ozzie et al. | |
| 2008/0320089 A1 * | 12/2008 | Jung et al. | 709/206 |
| 2010/0036601 A1 | 2/2010 | Ozawa et al. | |

OTHER PUBLICATIONS

Office Action, U.S. App. No. 11/413,109, mailed Dec. 11, 2009 (7 pages).

Office Action, U.S. App. No. 11/321,648, mailed Jun. 19, 2009 (6 pages).

Office Action, U.S. App. No. 11/321,648, mailed Mar. 10, 2010 (7 pages).

Terada, T. et al., "Design of a Car Navigation System that Predicts User Destination," Proceedings of the 7$^{th}$ International Conference on Mobile Data Management (MDM'06). IEEE. May 2006 (6 pages).

* cited by examiner

USER BEHAVIOR-BASED REMOTELY-TRIGGERED AUTOMATED ACTIONS

CROSS REFERENCE TO RELATED APPLICATIONS

This application is a continuation of and claims priority to U.S. patent application Ser. No. 11/944,006, filed Nov. 21, 2007 now U.S. Pat. No. 8,170,960 (now allowed), which claims the benefit of U.S. Provisional Application No. 60/867,077, filed Nov. 22, 2006, and titled USER-BEHAVIOR REMOTELY-TRIGGERED HOME/OFFICE AUTOMATION.

TECHNICAL FIELD

This description relates to using an automated system to trigger actions on behalf of a user at a predicted destination of the user.

BACKGROUND

Mobile devices may include location providing systems that identify a location for the mobile device. For example, a wireless phone may include a GPS ("Global Positioning System") system, and a car may have a navigation system that provides driving directions to a user-specified destination.

DETAILED DESCRIPTION

Techniques are described for enabling an automated system to trigger actions on behalf of a user based upon the user's behavior. The techniques enable the automated system to act as an intelligent personal assistant to the user. For example, the automated system may enable the user to automate a broad range of actions that are predictable based on user behavior. Using information about a user's predicted destination, an automated system may perform an action related to a predicted destination on behalf of the user. For example, if the automated system determines, or receives information indicating that the user is traveling in the direction of home, the automated system may trigger actions within the user's home so that the home is prepared to support the user upon arrival. To determine the action, or actions, to perform at a particular destination, the user may configure the automated system to analyze the user's past behavior and determine actions that the user would most likely perform at the predicted destination. Alternatively, the user may configure the automated system, such that particular actions are associated with the user and with a predicted destination.

Figure 1:
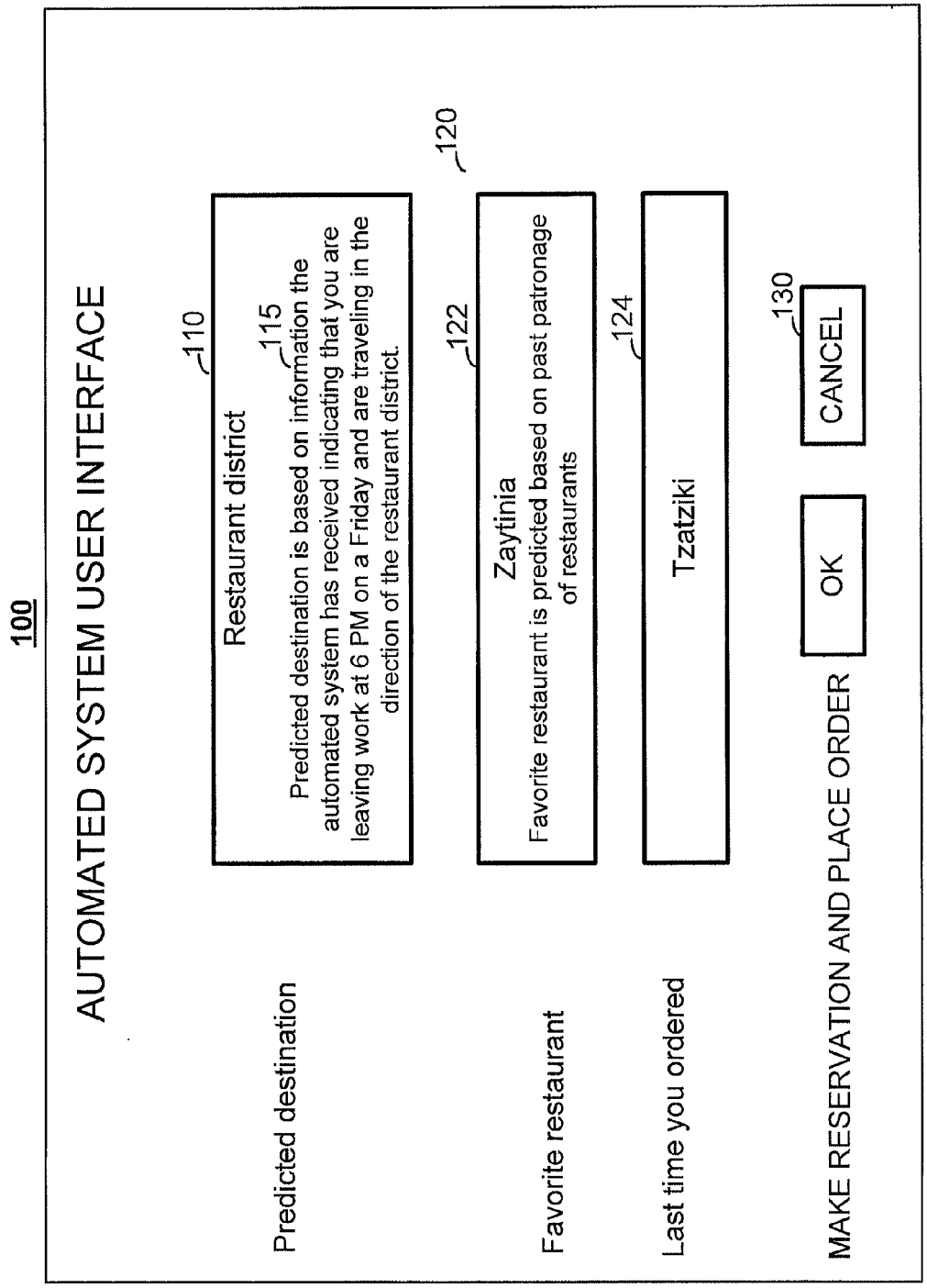
FIG. 1 shows an exemplary user interface for using an automated system.

FIG. 1 shows an exemplary user interface 100 for an automated system capable of performing actions on behalf of a user. In one implementation, an automated system presents the user interface 100 to a user of the automated system.

The user interface 100 includes a predicted destination portion 110 that indicates the user's destination as predicted by the automated system. Predicted destination portion 110 includes an explanation portion 115 that displays the basis upon which the automated system determined the predicted destination. In the example shown in FIG. 1, the automated system has predicted that the user's destination is the restaurant district. The explanation portion 115 displays text indicating that the automated system used ongoing geographical locations of the user (e.g., a series of recorded locations indicating that the user is leaving work and heading in the direction of the restaurant district), the time of day (6 PM), and the day of the week (Friday) as factors to determine that the user's predicted destination is the restaurant district.

The user interface 100 also includes an action portion 120. The action portion 120 includes information related to the predicted destination displayed in the predicted destination portion 110. For example, the information displayed in the action portion 120 may relate to the action, or actions, that the automated system may take at the user's predicted destination. The action portion 120 may include a window 122 and a window 124. In the example shown in FIG. 1, the window 122 indicates that the automated system has predicted that the user's favorite restaurant is "Zaytinia." The window 122 also indicates that the prediction of the user's favorite restaurant is based on the user's past visits to restaurants in the restaurant district. The window 124 indicates an entrée that the user ordered at the restaurant in the past. The user interface 100 may display additional information appropriate to the user's predicted destination in the action portion 120.

The user interface 100 also includes an action acceptor control 130. The action acceptor control 130 enables the user of the automated system to indicate whether the automated system should perform the proposed action, or actions, shown in the action portion 120. In the example shown in FIG. 1, the proposed action is to make a reservation at the predicted favorite restaurant ("Zaytinia") and place an order for the entrée shown in the window 124 ("Tzatziki"). If the user indicates approval of the proposed action using the action acceptor control 130, the automated system may perform the proposed action. In another implementation, the automated system may act through a central server that functions as an intermediary. The intermediary may be a special-purpose carrier, such as an on-line service provider (e.g., AOL), or the intermediary may be a common carrier.

The example user interface 100 shown in FIG. 1 indicates that the user's predicted destination is the restaurant district, and the user interface 100 shows a proposed action based upon an entrée that the user ordered during a previous visit to the same restaurant. In other implementations, when the user's predicted destination is one in which the user may wish to vary the action that the automated system takes, the automated system may present the user with a list of options instead of, or in addition to, a single action predicted by the automated system. Examples of destinations in which the user may wish to vary the automated system's action may include, for example, restaurants, movie theaters, evening entertainment districts, and sporting events. Thus, if the user's predicted destination is the restaurant district, the automated system may present the user with a list of restaurants in the geographical area so that the user may select a restaurant in addition to displaying the restaurant that the automated system predicts for the user. For example, the list of restaurants could be a list of the restaurants that the user has visited within the past month, a listing of newly-opened restaurants, and/or a listing of restaurants that have a high rating from a local news source or Internet poll. This implementation enables the automated system to provide the user with flexibility while still anticipating the action, or actions, that the automated system takes on the user's behalf at the predicted destination.

In yet another example, the user's predicted destination may be one that lends itself to the automated system taking the same action each time the user is predicted to arrive at the particular destination. An example of such a destination and action is turning on the lights in the user's home when the user's predicted destination is home and the time of arrival is after sunset. For such destination and action combinations, the automated system may trigger the action without presenting the user interface 100 to the user. This implementation results in the automated system being less intrusive to the user when the system performs routine tasks.

Figure 2:
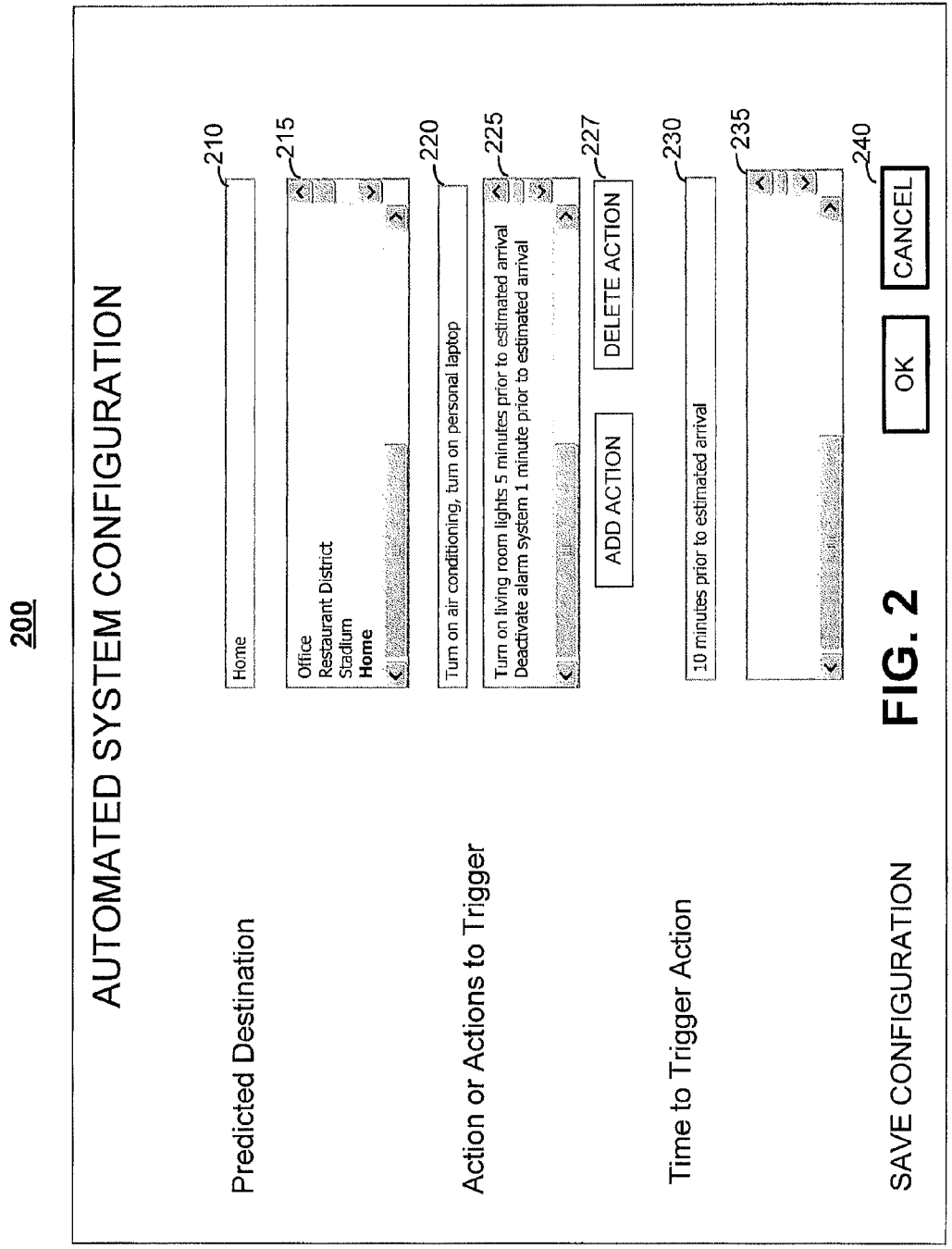
FIG. 2 shows an exemplary user interface for configuring an automated system.

FIG. 2 shows an exemplary user interface 200 that enables a user of the automated system to configure the automated system such that a particular action, or actions, is associated with the user and a particular predicted destination. Configuring the automated system enables the user to specify that the automated system should perform a particular action related to a predicted destination.

The user interface 200 includes a predicted destination control 210 that enables the user to specify a predicted destination. The user interface 200 also may include a predicted destination display 215 that displays available predicted destinations. The predicted destinations shown in the predicted destination display 215 may be destinations that the user configured previously. Additionally, the predicted destinations shown in the predicted destination display 215 may be default destinations provided by the automated system. The predicted destination control 210 may be, for example, a dialog box, or other user interface element, into which the user directly enters a descriptive name for a predicted destination. Alternatively, the user may select a predicted destination from the list shown in the predicted destination display 215. In the example shown in FIG. 2, the user has selected to configure the existing predicted destination, "Home," using the predicted destination display 215.

The user interface 200 also includes an action control 220 that enables the user to associate an action, or actions, with the predicted destination indicated in the predicted destination control 210. The user interface 200 also may include an action display 225 that shows the actions that are associated with the predicted destination. The user interface 200 also may include an association control 227 that enables the user to add or delete actions associated with a predicted destination.

In the example shown in FIG. 2, the user has indicated, in the action control 220, that when the predicted destination is "Home," the automated system should turn on the air conditioning in the house and turn on the user's personal laptop. The action display 225 displays actions that are associated with the predicted destination. In the example shown, the actions associated with the predicted destination ("Home") indicate that the automated system will turn on the lights in the user's home five minutes prior to the user's estimated arrival time, and that the automated system will deactivate the alarm system one minute prior to the user's estimated arrival time. The actions displayed in action display 225 may have been previously defined by the user. The user also may delete actions from the action display 225 using the association control 227. Deleting actions from the action display 225 will cause the deleted action to not be associated with the predicted destination such that the automated system will not perform the action.

The user interface 200 also includes an action time control 230 that enables the user to specify when the automated system should trigger the action specified in the action control 220. In the example shown in FIG. 1, the user has indicated that the air conditioning and the user's personal laptop should be activated ten minutes prior to the user's arrival at home. The user interface 200 also includes an action time display 235 that displays the time, if a time has been predefined, that the automated system should perform the action. In the example shown in FIG. 2, the user has defined the time that the automated system should perform the action as relative to the user's expected arrival time at the predicted destination. In other implementations, the user may specify an absolute time for the automated system to perform the action associated with the particular destination.

The user interface 200 also includes a configuration control 240 that enables the user to persistently store the configuration specified in user interface 200. Alternatively, the user may elect to not save the configuration. If the user elects to save the configuration, the specified configuration will be associated with the predicted destination such that when the user selects the predicted destination in the destination display 215, the associated settings will be displayed in the action display 225, and the action time display 235. Additionally, if the user elects to save the configuration, a processor displaying the graphical user interface 200 may generate a script to enable the automated system to trigger the actions specified in the user interface 200.

Figure 3:
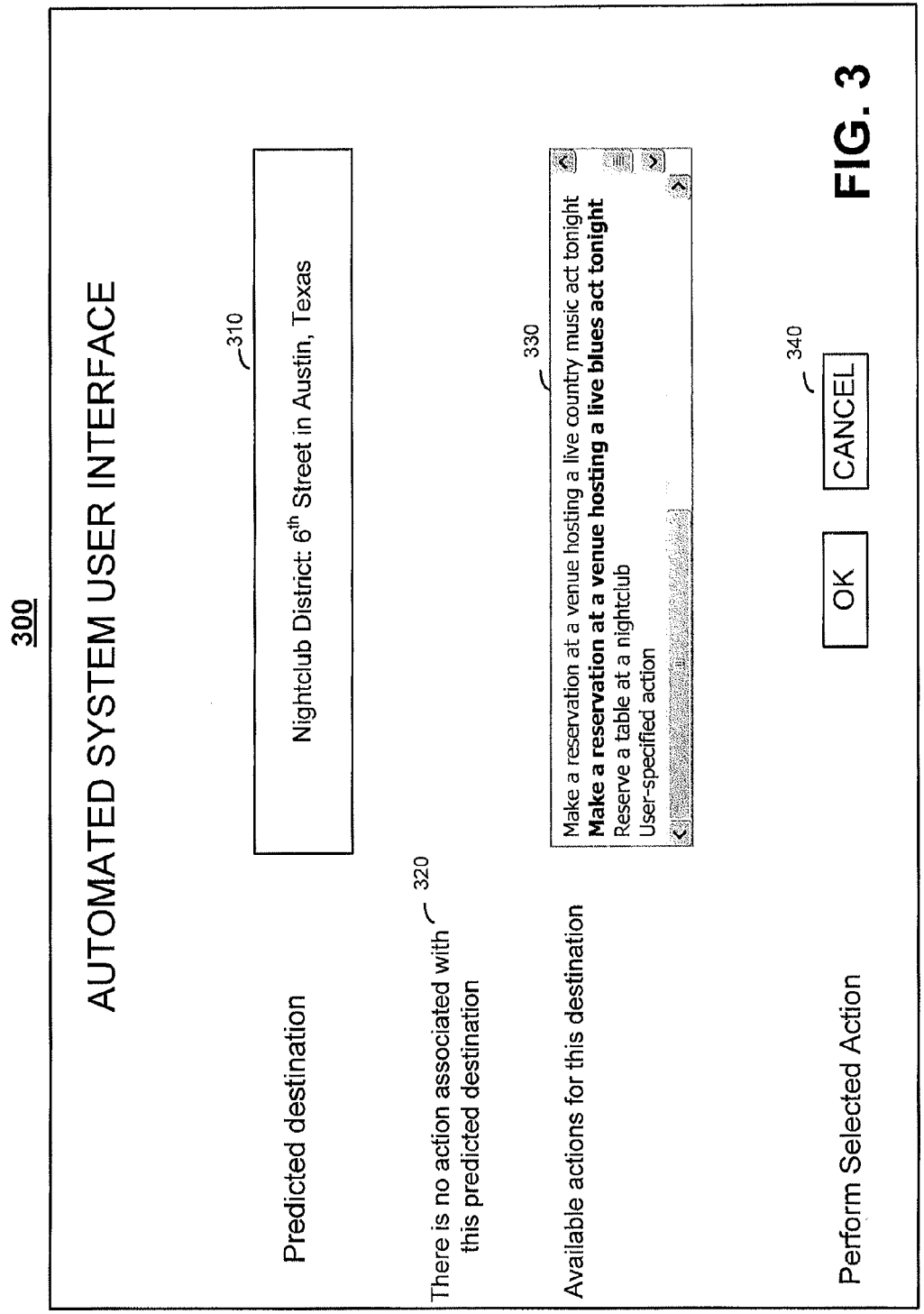
FIG. 3 shows an exemplary user interface for using an automated system.

FIG. 3 shows an exemplary user interface 300 that enables a user of the automated system to specify the action from among a list of possible actions suggested by the automated system. The user interface 300 includes a predicted destination section 310 that displays the user's predicted destination. The user interface 300 also includes a status portion 320 that indicates whether there is an action, or actions, associated with the predicted destination displayed in the destination portion 310. The user interface 300 also includes an action portion 330 that displays the actions that the automated system can perform at the predicted destination and an action control 340 that enables the user to indicate whether the automated system should take the action specified in action portion 330.

If the user has not associated any actions with the predicted destination, the automated system may activate a default script or prompt the user to specify an action for the automated system to take. Alternatively, the automated system may present a list of possible actions. In the example shown in FIG. 3, the automated system determines that the user's predicted destination is the 6$^{th}$ Street Nightclub District in Austin, Tex. and displays this information in the predicted destination section 310. The status portion 320 indicates that there are no actions associated with this predicted destination for the user. The automated system displays a list of possible actions in the action portion 330. In the example shown in FIG. 3, the automated system suggests making a reservation at a venue hosting a live country music act, making a reservation at a venue hosting a live blues music act, reserving a table at a nightclub, or a user-specified action. In some implementations, when the user selects a possible action from the list shown in action portion 330, the automated system may display another list showing possible actions within the available action. For example, in the user interface 300 shown in FIG. 3, the user has selected to make a reservation at a venue that is hosting a live blues act. If multiple venues are hosting live blues acts, then the automated system may display a list of all of the venues such that the user may select one. Alternatively, the automated system may select a venue for the user. The automated system may make the selection based on factors such as, for example, the automated system's knowledge of the user's past visits to the venue, ratings of the venue by other patrons, and the venue's cover charge.

The automated system may have obtained the possible actions by searching the web for activities occurring near the user's predicted destination and at the time of the user's arrival at the predicted destination. In other implementations, the automated system may have previously obtained information related to the predicted destination from, for example, a local news source. In still other implementations, the automated system may initiate a discovery process at the predicted destination to determine the list of possible actions. For example, if the user's predicted destination is home, the automated system may initiate a home discovery process to determine if there are appliances in the user's home that may be remotely activated and controlled. The home discovery process may use a set-top box, or similar device, located in the user's home to locate, identify, and communicate with other local remotely-controllable devices that are within close physical proximity to the set-top box. If the home discovery process determines that there are remotely-controllable devices within the user's home, it may provide information to the automated system indicating the type of devices available. The automated system may then present a suggested list of actions related to the devices to the user of the automated system. For example, if the home discovery process reveals that the user's home has remotely-controllable lighting, the automated system may suggest to the user that the lighting be activated near sunset. Alternatively, the automated system may select an action to take at the predicted destination based on the past behavior of the user.

If the user has associated actions with the predicted destination, then the user interface 300 may display the associated actions in the action portion 330. The user may specify actions associated with the predicted destination using a configuration user interface such as the one shown in FIG. 2.

Figure 4:
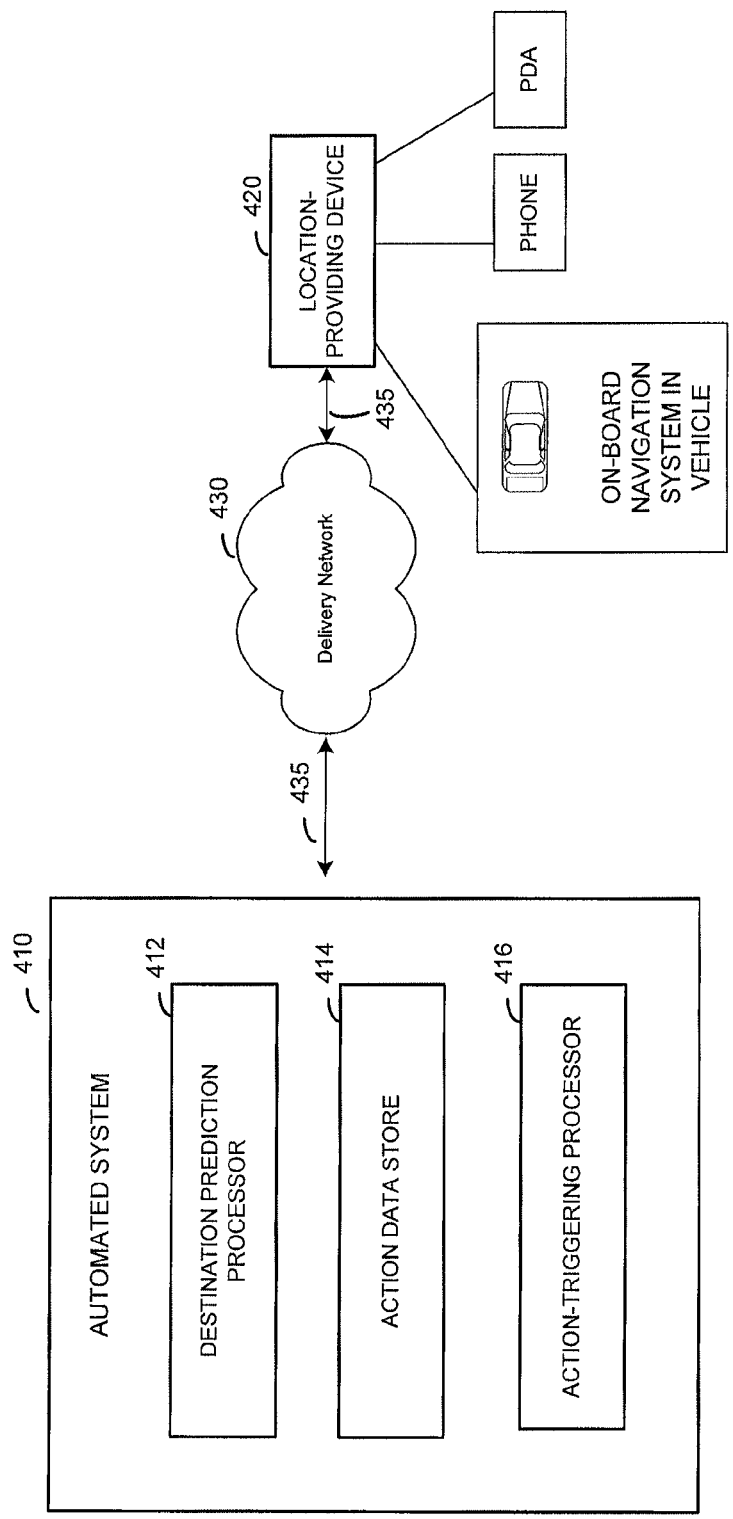
FIG. 4 shows a block diagram of a communications system capable of enabling communications between an automated system and a location-providing device.

FIG. 4 shows a communications system 400 that is capable of delivering and exchanging data between an automated system 410 and a location-providing device 420 through a delivery network 430. The location-providing device 420 may be associated with the user of the automated system such that the location-providing device 420 provides the automated system with information regarding the user's geographic location. The automated system 410 may be implemented using, for example, a general-purpose computer capable of responding to and executing instructions in a defined manner, a special-purpose computer, a workstation, a server, a device, a component, or other equipment or some combination thereof capable of responding to and executing instructions.

More particularly, the automated system 410 includes a destination prediction processor 412, an action data store 414, and an action-triggering processor 416. The destination processor 412 may include code segments, that when executed, predict the user's destination. In one implementation, the destination processor 412 may use location information associated with the user, and provided by the location-providing device 430, to predict the user's destination. For example, the location-providing device 430 may provide the automated system 410 with a global positioning system (GPS) log that includes the user's geographical location over a period of time. The log may indicate that the user's current location is between the user's office and the user's home. From this information, the automated system 410 may infer that the user's predicted destination is the user's home. In another implementation, the destination processor 412 may consider device-specific, user-specific, and environmental factors to predict the user's most likely action. For example, the destination processor 412 may use information indicating the time of day and day of the week when the user's locations were recorded. The automated system 410 may consider that the user's location was at the user's office at 6:00 PM and the user's location at 6:30 PM is in between the user's office and the user's home. The automated system 410 also may consider the day of the week and the user's travel patterns on other days at similar times to strengthen its prediction that the user's predicted destination is the user's home.

The automated system 410 also includes an action data store 414. The action data store 414 may include actions that the user has associated with particular predicted destinations. For example, the action data store 414 may include actions that the user associated with a predicted destination and persistently stored using a configuration user interface such as the user interface 200 described with respect to FIG. 2. The action data store 414 may also include data that indicates the actions that the user has selected in the past when the automated system presented the user with a list of possible actions for a predicted destination without associated actions. The action data store also includes information related to the user's past actions such as, for example, the time of day the action occurred and the day of the week when the action occurred.

The automated system 410 also includes an action-triggering processor 416. If the user has associated an action with the predicted destination such that the action is stored in the action data store 414, the action-triggering processor 416 may execute code, such as a script or function, to cause the action to occur. The action triggering processor 416 also may include code segments that, when executed, determine an action that the user would most likely take at the predicted destination. Using the data in action data store 414, the action-triggering processor 416 may analyze the user's past behavior at the predicted destination, or similar predicted destinations, and determine an action that the user would most likely take at the predicted destination. Analysis of the user's past behavior may include consideration of multiple factors related to the user's past behavior. The factors may include, for example, past actions that the user selected through the automated system at the predicted destination, the time of day and day of the week when the user selected the past actions, the frequency with which the user took a particular action in the past at the predicted destination, the time of day that the user is predicted to arrive at the destination, and the day of the week that the user is predicted to arrive at the destination. The action-triggering processor 416 also may compute a likelihood that the determined action is appropriate and compare the likelihood to a predefined threshold value. In this implementation, the action-triggering processor 416 triggers the determined action only if the likelihood exceeds the threshold value.

The location-providing device 420 includes a device capable of providing location information. For example, the location-providing device 420 may be a mobile communications device associated with the user and capable of providing global positioning system ("GPS") data indicating the location of the user to the automated system 410. The location-providing device 420 may be, for example, a cellular telephone, an in-vehicle navigation system, or a personal data assistant ("PDA"). The location-providing device 420 also may include a log that stores information related to the device's location over time. The location-providing device may provide the log to the destination prediction processor 412, and the destination prediction processor 412 may use the log to predict the user's destination. The location-providing device 420 also may provide the log to the action-triggering processor 416 such that the action-triggering processor may consider the log when determining a predicted action to take at the predicted destination.

The delivery network 430 provides a direct or indirect communication link between the automated system 410 and the location-providing device 420. Examples of the delivery network 430 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High Bit-Rate Digital Subscriber Line"), and VDSL ("Very high bit-rate Digital Subscriber Line)), radio, television, cable, satellite, and/or any other delivery mechanism for carrying data. The delivery network 430 also includes communication pathways 435 that enable the automated system 410 and the location-providing device 420 to communicate with the delivery network 430.

Figure 5:
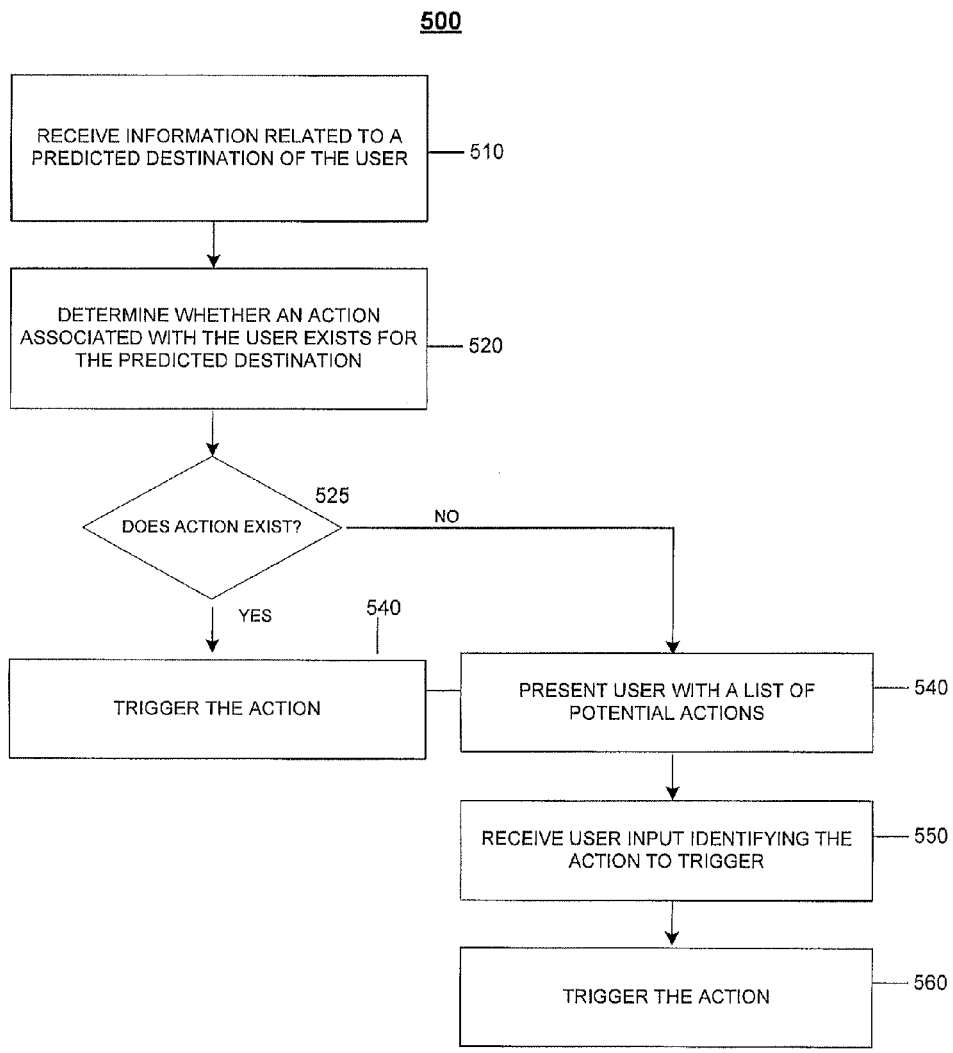
FIG. 5 is a flow chart of a process for using an automated system to trigger an action at a predicted location.

FIG. 5 shows an exemplary process 500 for triggering an action based on a predicted destination of a user. The process 500 may be performed by one or more processors in a system, such as, for example, the automated system 410 described with respect to FIG. 4.

The processor receives information related to a predicted destination of a user (510). For example, the processor may receive global positioning system (GPS) data from a location-specifying device associated with the user. The GPS data may include, for example, the current geographical location of the user and a log that specifies the previous location, or locations, of the user. The processor also may receive metadata related to a recorded location of the user such as, for example, the time of day and the day of the week.

The processor determines whether an action associated with the user exists for the predicted destination (520). For example, the processor may query the action data store 414 described in the context of FIG. 4, to determine whether an action exists. The processor then determines how to proceed based on whether the action exists (525). If an action is associated with the user for the predicted location, the processor triggers the action (530). If an action is not associated with the user, the processor may present the user with a list of potential actions (540). The list of potential actions may be generated by analyzing the user's past behavior as described with respect to the action-triggering processor in FIG. 4. The processor receives input from the user identifying the action from the action to trigger (550), and the processor triggers the action (560).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

Other implementations are within the scope of the following claims. For example, a user prompt to trigger an action may be sent to an instant messenger application on a mobile device (e.g., a wireless phone). The instant message may include a form that permits the user to select one of several suggested actions.

In another configuration, the automated system is configured to suggest user actions in response to analyzing repetitive user behaviors. For example, in the case of a particular user that walks to a local coffee store every morning and orders a Venti Latte through a GPS-enabled device's mobile browser, the automated system may identify a new behavior that is triggered on user movement in the morning from the office towards the local coffee store. As a result, and in response to detecting additional user movement in the morning from the office towards the local coffee store, the automated system predictively determines that the particular user is visiting the local coffee store (using for example, a tracked GPS path) and presents the user with an advertisement/offer from the local coffee store to order a Venti Latte. The user then may merely select an "accept" prompt in the advertisement to complete the transaction, rather than browsing to a website and going through the order process.

The automated system may be configured to interface with third party partners. For example, an online reservation provider may enable the automated system to perceive which reservations are available by location. The automated system then may present the one or more suggested reservations based on the user profile, predicted destination and arrival time, and available reservations. The automated system may enable placement of advertisements, coupons, and/or incentives to inspire user selection of one or more restaurants. The restaurant (or other establishment), in turn, may provide suggested actions that comport with the format used by a library that maps user actions to destinations. In one configuration, an automated system is configured to advertise to relevant venues that a particular user with a particular profile (e.g., size) is expected to be in a particular destination at a particular time. The restaurants may tailor their response by providing suggested actions, incentives, and/or working with the automated system to place an advertisement.

In another configuration, triggering the user action includes triggering communications. For example, if a person calls home to notify family members that the person has left the office and is on the way home, the automated system identify this notification to family members. As a result, the automated system may prompt the user to see if they user would like to (1) have an automated attendant place a call informing family members that the user has left the office, (2) send a message to family members conveying the same information, and/or (3) place a call for the user so that the user may speak with family members.

The user may selectively reconfigure privacy controls so that the automated system may learn more about the user's actions. For example, the log of location information may be analyzed to identify which establishments were frequented by the user. The log may indicate that the user visited a movie theater for two hours and then visited a restaurant for two hours. As a result and in response to predicting the destination of the user to be the same neighborhood, the automated system may adjust the metrics for suggested user actions to favor the movie theater and the restaurant.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identifier of an account, but any other unique identifier of an account may be used when linking accounts. Accordingly, other implementations are within the scope of the following claims.

What is claimed is:

1. A method for triggering an action, the method comprising:
  receiving information related to a predicted destination of a user;
  determining, using a processor, whether a first action associated with the user exists for the predicted destination by analyzing past behavior of the user;
  computing a likelihood of whether the first action associated with the user is appropriate in connection with an arrival at the predicted destination;
  automatically triggering the first action when the likelihood is supported by a predefined threshold value;
  performing a search to identify a plurality of additional actions associated with the predicted destination;
  prompting the user to select one or more actions from the plurality of additional actions; and
  triggering the one or more selected actions.

2. The method of claim 1 further comprising:
  accessing a library that maps user actions to destinations;
  determining that at least one of the destinations in the library corresponds with the predicted destination of the user;
  identifying a second action, within the library, that is associated with the destination determined to correspond with the predicted destination of the user;
  triggering the second action.

3. The method of claim 1 further comprising:
  accessing a library that maps user actions to predicted arrival times at destinations;
  determining that at least one of the predicted arrival times in the library corresponds with the predicted arrival time of the user and at least one of the destinations in the library;
  identifying a second action, within the library, that is associated with the predicted arrival time determined to correspond with the predicted arrival time of the user; and
  triggering the second action.

4. The method of claim 1 wherein triggering the one or more selected actions includes at least one of configuring a home appliance to perform a specified action at a specified time and making a reservation for a restaurant at the predicted destination.

5. The method of claim 1 further comprising:
  accessing a library, stored in a memory device, that maps user actions to destinations;
  determining that at least one of the destinations in the library corresponds to a restaurant;
  identifying available reservations for the restaurant;
  receiving a selection from among the available reservations; and
  entering the reservation on behalf of the user.

6. The method of claim 1 further comprising:
  identifying the predicted destination for the user;
  determining that the predicted destination is associated with a particular communications pattern for the user;
  identifying a particular communication within the particular communications pattern;
  triggering the particular communication on behalf of the user, wherein the particular communication includes a text message indicating that the user is driving towards a particular destination, a voice message that the user is driving towards a particular destination, or establishing a connection between the user and a different user associated with the particular destination.

7. The method of claim 1 wherein triggering the one or more selected actions includes activating a script associated with the destination.

8. The method of claim 1 wherein triggering the one or more selected actions includes triggering the one or more selected actions based on a predicted arrival time of the user at the predicted destination.

9. The method of claim 1 wherein:
  performing a search to identify a plurality of additional actions associated with the predicted destination includes performing a search over the Internet to identify a plurality of potential destinations near the predicted destination; and
  prompting the user to select one or more actions from the plurality of additional actions includes presenting to the user a description of each of the plurality of potential destinations near the predicted destination.

10. The method of claim 1 wherein:
  performing a search to identify a plurality of additional actions associated with the predicted destination includes performing a search over the Internet to identify a plurality of activities occurring near the predicted destination at a predicted arrival time of the user at the predicted destination; and
  prompting the user to select one or more actions from the plurality of additional actions includes presenting to the user a description of each of the plurality of activities occurring near the predicted destination at a predicted arrival time of the user at the predicted destination.

11. The method of claim 1 wherein:
  performing a search to identify a plurality of additional actions associated with the predicted destination includes initiating a home discovery process to determine if there is at least one device in the user's home that may be remotely activated and controlled;
  prompting the user to select one or more actions from the plurality of additional actions includes presenting to the user a list of actions related to the at least one device discovered by the home discovery process; and triggering the one or more selected actions comprises triggering at least one action from the list of actions related to the at least one device discovered by the home discovery process.

12. The method of claim 1 further comprising:
determining that an action associated with the user for the predicted destination does not exist;
presenting the user with a list of potential actions; and
receiving user input that identifies the action to be triggered from among the potential actions.

13. The method of claim 1 further comprising:
presenting the user with a description of each of the plurality of additional actions;
receiving user input indicating whether at least one of the plurality of additional actions should be triggered; and
triggering the at least one additional action if the user indicates the action should be triggered.

14. The method of claim 1 wherein receiving information related to a predicted destination of a user includes receiving global positioning system (GPS) data indicating the current geographical location of the user.

15. The method of claim 1 wherein receiving information related to a predicted destination of a user further includes receiving data indicating a previous geographic location of the user.

16. The method of claim 1 wherein receiving information related to a predicted destination of a user includes receiving an indication of the time of day.

17. The method of claim 1 wherein receiving information related to a predicted destination of a user includes receiving global positioning system (GPS) data indicating a series of geographical locations through which the user has traveled, an indication of the time of day, and an indication of the day of the week.

18. The method of claim 1 wherein receiving information related to a predicted destination of a user includes receiving an indication of the previous activity of the user with respect to the predicted destination.

19. A system that triggers an action, the system comprising:
a memory device; and
a processor configured to:
receive information related to a predicted destination of a user;
determine whether a first action associated with the user exists for the predicted destination by analyzing past behavior of the user;
compute a likelihood of whether the first action associated with the user is appropriate in connection with an arrival at the predicted destination;
automatically trigger the first action when the likelihood is supported by a predefined threshold value;
perform a search to identify a plurality of additional actions associated with the predicted destination;
prompt the user to select one or more actions from the plurality of additional actions; and
trigger the one or more selected actions.

20. A computer program tangibly embodied on a non-transitory computer readable medium, the computer program comprising instructions that when executed on a processor cause the program to:
receive information related to a predicted destination of a user;
determine whether a first action associated with the user exists for the predicted destination by analyzing past behavior of the user;
compute a likelihood of whether the first action associated with the user is appropriate in connection with an arrival at the predicted destination;
automatically trigger the first action when the likelihood is supported by a predefined threshold value;
perform a search to identify a plurality of additional actions associated with the predicted destination;
prompt the user to select one or more actions from the plurality of additional actions; and
trigger the one or more selected actions.

* * * * *